(12) United States Patent
Horikawa et al.

(10) Patent No.: US 11,515,527 B2
(45) Date of Patent: Nov. 29, 2022

(54) POSITIVE ELECTRODE OF SECONDARY BATTERY, AND SECONDARY BATTERY USING SAME

(71) Applicants: TOYOTA JIDOSHA KABUSHIKI KAISHA, Toyota (JP); NATIONAL UNIVERSITY CORPORATION OKAYAMA UNIVERSITY, Okayama (JP)

(72) Inventors: Daisuke Horikawa, Toyota (JP); Yuji Yamamoto, Toyota (JP); Takashi Teranishi, Okayama (JP)

(73) Assignees: TOYOTA JIDOSHA KABUSHIKI KAISHA, Toyota (JP); NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 288 days.

(21) Appl. No.: 16/883,155

(22) Filed: May 26, 2020

(65) Prior Publication Data
US 2020/0388835 A1 Dec. 10, 2020

(30) Foreign Application Priority Data

Jun. 6, 2019 (JP) .............................. JP2019-106060

(51) Int. Cl.
*H01M 4/131* (2010.01)
*H01M 4/36* (2006.01)
(Continued)

(52) U.S. Cl.
CPC ........... *H01M 4/366* (2013.01); *H01M 4/131* (2013.01); *H01M 4/483* (2013.01); *H01M 4/485* (2013.01);
(Continued)

(58) Field of Classification Search
CPC ...... H01M 4/366; H01M 4/131; H01M 4/483; H01M 4/485; H01M 10/0525; H01M 2004/028
See application file for complete search history.

(56) References Cited

U.S. PATENT DOCUMENTS 6,395,426 B1 * 5/2002 Imachi .............. H01M 10/0565
429/231.3
2016/0329539 A1  11/2016 Kawaji et al.

FOREIGN PATENT DOCUMENTS

JP  2008-226463 A  9/2008
JP  2011-146158 A  7/2011
(Continued)

*Primary Examiner* — Jane J Rhee
(74) *Attorney, Agent, or Firm* — Oliff PLC

(57) ABSTRACT

A positive electrode imparts secondary battery with low temperature output characteristics, high temperature cycle characteristics and durability against high voltage. A positive electrode of secondary battery includes positive electrode current collector and positive electrode active substance layer on positive electrode current collector. The positive electrode active substance layer contains positive electrode active substance particles and oxide particles which are dispersed in positive electrode active substance layer as separate particles from positive electrode active substance particles. The positive electrode active substance particles each include coating of titanium-containing compound at the surface. The titanium-containing compound in coating is at least one compound selected from group consisting of $TiO_2$, $Ti_nO_{2n-1}$, wherein n is integer of 3 or more, and oxides containing Li and Ti. The oxide particles include at least one oxide selected from group consisting of $TiO_2$, $Ti_mO_{2m-1}$, wherein m is integer of 3 or more, and oxides containing Li and Ti.

5 Claims, 3 Drawing Sheets

(51) Int. Cl.
    *H01M 4/485*      (2010.01)
    *H01M 10/0525*      (2010.01)
    *H01M 4/48*      (2010.01)
    *H01M 4/02*      (2006.01)

(52) U.S. Cl.
    CPC .. *H01M 10/0525* (2013.01); *H01M 2004/028* (2013.01)

(56) References Cited

FOREIGN PATENT DOCUMENTS

| | | |
|---|---|---|
| JP | 2013-149433 A | 8/2013 |
| JP | 2015-099646 A | 5/2015 |
| JP | 2017-152294 A | 8/2017 |
| WO | 2015/128982 A1 | 9/2015 |

\* cited by examiner

POSITIVE ELECTRODE OF SECONDARY BATTERY, AND SECONDARY BATTERY USING SAME

BACKGROUND OF THE INVENTION

1. Field of the Invention

The present disclosure relates to a positive electrode of a secondary battery. The present disclosure also relates to a secondary battery using the positive electrode. It should be noted that this application claims priority on the basis of Japanese Patent Application No. 2019-106060, which was filed on Jun. 6, 2019, and the entire contents of that application are incorporated by reference in this specification.

2. Description of the Related Art

In recent years, secondary batteries such as lithium secondary batteries have been advantageously used as portable power sources for personal computers, handheld devices, and the like, and as motive power sources for vehicles such as electric vehicles (EV), hybrid vehicles (HV) and plug-in hybrid vehicles (PHV).

As secondary batteries such as lithium secondary batteries have become more widespread, there have been demands for higher performance. In general, positive electrode active substances able to store and release lithium ions are used in positive electrodes of lithium secondary batteries. Use of positive electrode materials obtained by coating the surface of a positive electrode active substance particle with a titanium-containing compound is known as a technique for improving the performance of lithium secondary batteries (for example, see Japanese Patent Application Publication Nos. 2015-099646 and 2017-152294).

SUMMARY OF THE INVENTION

As a result of diligent research, the inventors of the present disclosure found that secondary batteries including positive electrodes obtained using conventional positive electrode materials exhibit increased resistance at low temperatures and are insufficient in terms of low temperature output characteristics. In addition, it was found that in cases where such secondary batteries are repeatedly charged and discharged at high temperatures, there is a significant deterioration in capacity and high temperature cycle characteristics are insufficient. Furthermore, it was found that such secondary batteries exhibit increased resistance when operated at high voltages and are insufficient in terms of durability against high voltage.

Therefore, it is an object of the present disclosure to provide a positive electrode which can impart a secondary battery with excellent low temperature output characteristics, excellent high temperature cycle characteristics and excellent durability against high voltage.

A positive electrode of a secondary battery disclosed here includes a positive electrode current collector and a positive electrode active substance layer provided on the positive electrode current collector. The positive electrode active substance layer contains positive electrode active substance particles and oxide particles which are dispersed in the positive electrode active substance layer as separate particles from the positive electrode active substance particles. The positive electrode active substance particles each include a coating containing a titanium-containing compound at a surface thereof. The titanium-containing compound in the coating is at least one compound selected from the group consisting of $TiO_2$, $Ti_nO_{2n-1}$, wherein n is an integer of 3 or more, and oxides containing Li and Ti. The oxide particles include at least one oxide selected from the group consisting of $TiO_2$, $Ti_mO_{2m-1}$, wherein m is an integer of 3 or more, and oxides containing Li and Ti.

Provided by such a configuration is a positive electrode which can impart a secondary battery with excellent low temperature output characteristics, excellent high temperature cycle characteristics and excellent durability against high voltage.

In a desired aspect of the positive electrode of a secondary battery disclosed here, an average particle diameter of the oxide particles is at least 0.5 nm and at most 1 μm.

According to such a configuration, the effects of improving low temperature output characteristics, improving high temperature cycle characteristics and improving durability against high voltage are particularly enhanced.

In a desired aspect of the positive electrode of a secondary battery disclosed here, an amount of Ti contained in the titanium-containing compound of the coating is at least 0.01 mass % and at most 5 mass % relative to a mass of a single particle of the positive electrode active substance particles.

According to such a configuration, the effects of improving low temperature output characteristics, improving high temperature cycle characteristics and improving durability against high voltage are particularly enhanced.

In a desired aspect of the positive electrode of a secondary battery disclosed here, an amount of Ti contained in the oxide particles is at least 0.001 mass % and at most 2 mass % relative to a mass of the positive electrode active substance particles.

According to such a configuration, the effects of improving low temperature output characteristics, improving high temperature cycle characteristics and improving durability against high voltage are particularly enhanced.

The secondary battery disclosed here includes the positive electrode described above.

According to such a configuration, the secondary battery exhibits excellent low temperature output characteristics, excellent high temperature cycle characteristics and excellent durability against high voltage.

DESCRIPTION OF THE PREFERRED EMBODIMENTS

Figure 1:
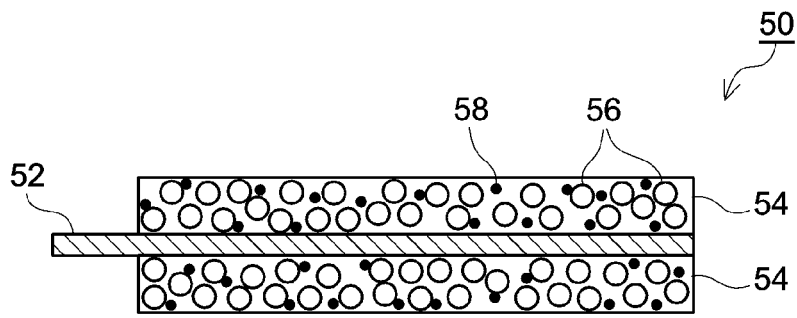
FIG. 1 is a schematic cross-sectional view showing an example of a positive electrode of a lithium secondary battery according to one embodiment of the present disclosure.

Hereinafter, an embodiment according to the present disclosure will be described. It should be noted that matters (for example, general configurations of the positive electrode of a secondary battery which do not characterize the present disclosure) other than the matter specifically set forth in the present specification and that may be necessary for carrying out the present disclosure may be comprehended as design matters for a person with ordinary skill in the art on the basis of prior art in the relevant field. The present disclosure can be carried out on the basis of the disclosure in the present specification and common general technical knowledge in the relevant field. In the drawings below, members and portions that elicit identical effects are denoted with identical reference numerals. The dimensional relationships (length, width, thickness and so forth) in the figures do not necessarily reflect actual dimensional relationships.

It should be noted that the term "secondary battery" in the present specification means electricity storage devices in general that can be repeatedly charged and discharged, and is a term that encompasses so-called storage batteries and electricity storage elements such as electrical double layer capacitors.

In addition, the term "lithium secondary battery" in the present specification means a secondary battery in which lithium ions are used as charge carriers and charging and discharging are effected by means of charge transfer involving lithium ions between positive and negative electrodes.

FIG. 1 is a cross sectional view that schematically illustrates a positive electrode of a secondary battery according to the present embodiment. A positive electrode 50 of a secondary battery according to the present embodiment includes a positive electrode current collector 52 and a positive electrode active substance layer 54 provided on the positive electrode current collector 52, as shown in the drawing. It should be noted that the positive electrode active substance layer 54 may be provided on both surfaces of the positive electrode current collector 52, as shown in the drawing, or on one surface of the positive electrode current collector 52, and is desirably provided on both surfaces of the positive electrode current collector 52.

The positive electrode current collector 52 is constituted from a metal having good electrical conductivity (for example, aluminum, nickel, or the like). The shape of the positive electrode current collector 52 is not particularly limited and may be, for example, plate-shaped, foil-like, or the like. An aluminum foil is desired as the positive electrode current collector 52.

The positive electrode active substance layer 54 contains positive electrode active substance particles 56 and oxide particles 58. The oxide particles 58 are dispersed in the positive electrode active substance layer 54 as separate particles from the positive electrode active substance particles 56. Positive electrode active substance particles 56 and oxide particles 58 can be in contact with each other in the positive electrode active substance layer 54 or joined by means of a binder, but unlike a state in which a positive electrode active substance particle having an oxide particle attached to the surface thereof is dispersed in the positive electrode active substance layer 54, positive electrode active substance particles 56 and oxide particles 58 are separately dispersed.

Figure 2:
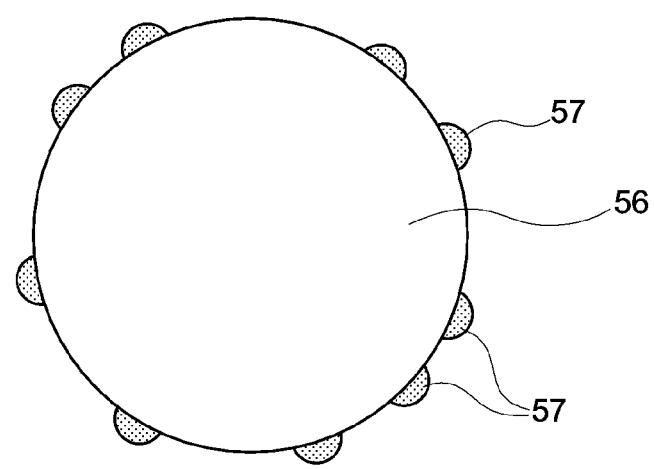
FIG. 2 is a schematic cross-sectional view showing an example of a positive electrode active substance particle contained in a positive electrode of a lithium secondary battery according to one embodiment of the present disclosure.

FIG. 2 is a schematic cross-sectional view showing an example of a positive electrode active substance particle 56. The positive electrode active substance particle 56 includes a coating 57 that contains a titanium-containing compound at the surface thereof, as shown in FIG. 2.

In the example shown, the coating 57 is present in the form of islands (that is to say, scattered) at the surface of the positive electrode active substance particle 56, but the manner in which the coating 57 covers the surface of the positive electrode active substance particle 56 is not particularly limited. It is possible for the coating 57 to form a single layer and completely cover the surface of the positive electrode active substance particle 56. However, from the perspective of battery characteristics, it is desirable for the coating 57 to be scattered at the surface of the positive electrode active substance particle 56 and partially cover the positive electrode active substance particle 56.

Publicly known positive electrode active substance particles used in secondary batteries (and particularly lithium secondary batteries) can be used for the positive electrode active substance particles 56. Specifically, it is possible to use, for example, particles of a lithium composite oxide, a lithium-transition metal phosphate compound, or the like, for the positive electrode active substance particles 56. The crystal structure of the positive electrode active substance is not particularly limited, and may be a layered structure, a spinel structure, an olivine structure, or the like.

A lithium-transition metal composite oxide containing at least one of Ni, Co and Mn as a transition metal element is desired as the lithium composite oxide, and specific examples thereof include lithium-nickel-based composite oxides, lithium-cobalt-based composite oxides, lithium-manganese-based composite oxides, lithium-nickel-manganese-based composite oxides, lithium-nickel-cobalt-manganese-based composite oxides, lithium-nickel-cobalt-aluminum-based composite oxides and lithium-iron-nickel-manganese-based composite oxides.

From the perspective of low initial resistance, the lithium composite oxide desirably has a layered structure, and a lithium-nickel-cobalt-manganese-based composite oxide having a layered structure is more desired.

It should be noted that in the present specification, "lithium-nickel-cobalt-manganese-based composite oxide" is a term that encompasses not only oxides containing Li, Ni, Co, Mn and O as constituent elements, but also oxides containing one or two or more additional elements in addition to these elements. Examples of such additional elements include transition metal elements and typical metal elements such as Mg, Ca, Al, Ti, V, Cr, Si, Y, Zr, Nb, Mo, Hf, Ta, W, Na, Fe, Zn and Sn. Furthermore, additional elements may be metalloid elements such as B, C, Si and P, and non-metallic elements such as S, F, Cl, Br and I. The same also applies to the lithium-nickel-based composite oxides, lithium-cobalt-based composite oxides, lithium-manganese-based composite oxides, lithium-nickel-manganese-based composite oxides, lithium-nickel-cobalt-aluminum-based composite oxides and lithium-iron-nickel-manganese-based composite oxides mentioned above.

An oxide having a composition represented by formula (I) below is desired as the lithium-nickel-cobalt-manganese-based composite oxide.

$$Li_{1+x}Ni_yCo_zMn_{(1-y-z)}M_\alpha O_{2-\beta}Q_\beta \qquad \text{Formula (I):}$$

In Formula (I), the values of x, y, z, α and β satisfy the inequalities $0 \le x \le 0.7$, $0.1 < y < 0.9$, $0.1 < z < 0.4$, $0 \le \alpha \le 0.1$, and $0 \le \beta \le 0.5$. M is at least one element selected from the group consisting of Zr, Mo, W, Mg, Ca, Na, Fe, Cr, Zn, Si, Sn and Al. Q is at least one element selected from the group consisting of F, Cl and Br. From the perspectives of energy density and thermal stability, it is desirable for y and z to satisfy the inequalities $0.3 \le y \le 0.5$ and $0.20 \le z < 0.4$.

Examples of lithium-transition metal phosphate compounds include lithium iron phosphate (LiFePO$_4$), lithium manganese phosphate (LiMnPO$_4$) and lithium iron manganese phosphate.

The shape of the positive electrode active substance particle 56 is not particularly limited, and can be spherical, plate-like, needle-shaped, irregular-shaped, or the like. In addition, positive electrode active substance particles 56 may be in the form of secondary particles caused by aggregation of primary particles, and may also be in the form of hollow particles.

The average particle diameter (D$_{50}$) of positive electrode active substance particles 56 is not particularly limited, but is, for example, at least 0.05 μm and at most 20 μm, desirably at least 0.5 μm and at most 15 μm, and more desirably at least 3 μm and at most 15 μm.

It should be noted that the average particle diameter (D$_{50}$) of positive electrode active substance particles 56 can be determined by means of, for example, a laser diffraction scattering method or the like.

In the present embodiment, the titanium-containing compound contained in the coating 57 is at least one compound selected from the group consisting of TiO$_2$, Ti$_n$O$_{2n-1}$, wherein n is an integer of 3 or more, and oxides containing Li and Ti.

The value of n in Ti$_n$O$_{2n-1}$ is not particularly limited as long as this is an integer of 3 or more, but the value of n is desirably an integer of at least 3 and at most 9, and more desirably an integer of at least 3 and at most 5. That is to say, Ti$_n$O$_{2n-1}$ is more desirably Ti$_3$O$_5$, Ti$_4$O$_7$ or Ti$_5$O$_9$.

The ratio of the number of atoms of Li relative to the number of atoms of Ti (Li/Ti) in the oxide containing Li and Ti (that is to say, a lithium-titanium composite oxide or lithium titanate) is not particularly limited, but is desirably at least 0.1 and at most 3.

It should be noted that methods for synthesizing lithium-titanium composite oxides (or lithium titanates) having a variety of Li and Ti atom number ratios are publicly known. In addition, the ratio of the number of atoms of Li relative to the number of atoms of Ti can be adjusted by subjecting at least two types of compound selected from the group consisting of a titanium oxide, a lithium oxide and a lithium-titanium composite oxide to a mechanochemical treatment for compounding, at a prescribed mixing ratio.

With regard to the amount of the coating 57, the amount of Ti contained in the titanium-containing compound of the coating 57 is desirably at least 0.01 mass % and at most 5 mass % relative to the mass of the positive electrode active substance particle. If the amount of Ti falls within this range, it is possible to further improve the low temperature output characteristics, high temperature cycle characteristics and durability against high voltage of a secondary battery. It should be noted that the amount of Ti in the titanium-containing compound of the coating 57 can be determined by means of ICP analysis or the like.

The thickness of the coating 57 is not particularly limited and is, for example, at least 0.1 nm and at most 100 nm. The thickness of the coating 57 can be determined by, for example, observing a cross section of a positive electrode active substance particle 56 with an electron microscope.

The content of the positive electrode active substance particles 56 in the positive electrode active substance layer 54 is not particularly limited, but is desirably 70 mass % or more, and more desirably 80 mass % or more.

The oxide particles 58 include at least one oxide selected from the group consisting of TiO$_2$, Ti$_m$O$_{2m-1}$, wherein m is an integer of 3 or more, and oxides containing Li and Ti.

The value of m in Ti$_m$O$_{2m-1}$ is not particularly limited as long as this is an integer of 3 or more, but the value of m is desirably an integer of at least 3 and at most 9, and more desirably an integer of at least 3 and at most 5. That is to say, Ti$_m$O$_{2m-1}$ is more desirably Ti$_3$O$_5$, Ti$_4$O$_7$ or Ti$_5$O$_9$.

In the oxide particles also, the ratio of the number of atoms of Li relative to the number of atoms of Ti (Li/Ti) in the oxide containing Li and Ti (that is to say, a lithium-titanium composite oxide or lithium titanate) is not particularly limited, but is desirably at least 0.1 and at most 3.

The average particle diameter of oxide particles 58 is not particularly limited, but is desirably at least 0.5 nm and at most 1 If the average particle diameter of oxide particles 58 falls within this range, it is possible to further improve the low temperature output characteristics, high temperature cycle characteristics and durability against high voltage of a secondary battery.

It should be noted that the average particle diameter of oxide particles 58 can be determined by photographing oxide particles 58 using an electron microscope such as a transmission electron microscope (TEM), and calculating the average value of the circle-equivalent diameters of 10 or more arbitrarily selected particles.

The content of the oxide particles 58 is not particularly limited, but is desirably such that the amount of Ti contained in the oxide particles 58 is at least 0.001 mass % and at most 2 mass % relative to the mass of the positive electrode active substance particles 56. If the amount of Ti contained in the oxide particles 58 falls within this range, it is possible to further improve the low temperature output characteristics, high temperature cycle characteristics and durability against high voltage of a secondary battery. It should be noted that the amount of Ti contained in the oxide particles can be determined by means of ICP analysis or the like.

The composition of the titanium-containing compound that constitutes the coating and the composition of the oxide particles are common, as shown above. The composition of the titanium-containing compound that constitutes the coating and the composition of the oxide particles may be the same as, or different from, each other.

The positive electrode active substance layer 54 may contain components other than the positive electrode active substance particles 56 and the oxide particles 58. Examples of such components include electrically conductive materials and binders.

Carbon black such as acetylene black (AB) or other carbon materials (graphite or the like) can be advantageously used as an electrically conductive material. The content of an electrically conductive material in the positive electrode active substance layer 54 is not particularly limited, but is desirably at least 1 mass % and at most 15 mass %, and more desirably at least 3 mass % and at most 13 mass %.

For example, poly(vinylidene fluoride) (PVDF) or the like can be used as a binder. The content of a binder in the positive electrode active substance layer 54 is not particularly limited, but is desirably at least 1 mass % and at most 15 mass %, and more desirably at least 1.5 mass % and at most 10 mass %.

By providing a coating 57 of a titanium-containing compound at the surface of the positive electrode active substance particles 56 and dispersing the oxide particles 58 which have a composition common with that of the titanium-containing compound, together with the positive electrode active substance particles 56, in the positive electrode active substance layer 54, in the positive electrode as described above, it is possible to improve the low temperature output characteristics, high temperature cycle characteristics and durability against high voltage of a secondary battery obtained using this positive electrode. It is surmised that this is for the following reason.

When a secondary battery is operated at a low temperature, the mobility of Li carriers in a non-aqueous electrolyte solution or solid electrolyte decreases, there is a delay in Li carriers reaching the surface of a positive electrode active substance, and low temperature output therefore decreases. In the present embodiment, however, the Li carrier concentration specifically increases in regions of a non-aqueous electrolyte solution or solid electrolyte close to both the coating 57 of a titanium-containing compound at the surface of the positive electrode active substance particles 56 and the oxide particles 58. A region where the Li carrier concentration is high acts as a buffer, and it is possible to suppress a shortage of Li at the surface of the active substance, and therefore possible to suppress a decrease in low temperature output.

In addition, in these regions where the Li carrier concentration is high, negatively charged oxygen ions and dissolved oxygen are concentrated at the same time. As a result, the apparent oxygen partial pressure or oxygen concentration increases at the surface of the positive electrode active substance, release of oxygen from the positive electrode active substance is suppressed and high temperature cycle characteristics are improved.

In addition, in cases where a secondary battery is operated at a high voltage (for example, 4.5 V or higher), decomposition of a non-aqueous electrolyte solution or solid electrolyte can advance. In the present embodiment, the decomposition potential of a non-aqueous electrolyte solution or solid electrolyte present between the oxide particles 58 and the coating 57 of a titanium-containing compound at surfaces of positive electrode active substance particles 56 shifts to a higher potential. As a result, durability against high voltage is improved.

The positive electrode according to the present embodiment can be produced in accordance with a publicly known method. The positive electrode can be advantageously produced using the method described below. However, the method for producing the positive electrode according to the present embodiment is not limited to the method described below.

Positive electrode active substance particles 56 having a coating 57 at the surface thereof are produced by subjecting a mixture of a titanium-containing compound that constitutes the coating 57 and positive electrode active substance particles 56 to a mechanochemical treatment using a publicly known mechanochemical apparatus. Alternatively, positive electrode active substance particles 56 having a coating 57 at the surface thereof are produced by causing a titanium-containing compound that constitutes the coating 57 to adhere to the surface of the positive electrode active substance particles 56 by means of sputtering.

Next, positive electrode active substance particles 56 having the coating 57 at the surface thereof, oxide particles 58, an optional electrically conductive material and an optional binder are mixed in the presence of a solvent so as to produce a positive electrode paste.

The positive electrode active substance layer 54 is formed by coating this positive electrode paste on a surface of the positive electrode current collector 52, and then drying. The positive electrode 50 can be obtained in this way. It should be noted that the positive electrode active substance layer 54 may be subjected to a pressing treatment in order to adjust density and the like of the positive electrode active substance layer 54.

The positive electrode according to the present embodiment is for a secondary battery, and it is possible to construct a secondary battery in accordance with a publicly known method using the positive electrode according to the present embodiment. The secondary battery is desirably a lithium secondary battery. Here, with reference to the drawings, an explanation will now be given of a specific example of a configuration of a lithium secondary battery provided with the positive electrode according to the present embodiment. It should be noted that such a lithium secondary battery is not limited to the example explained below.

Figure 3:
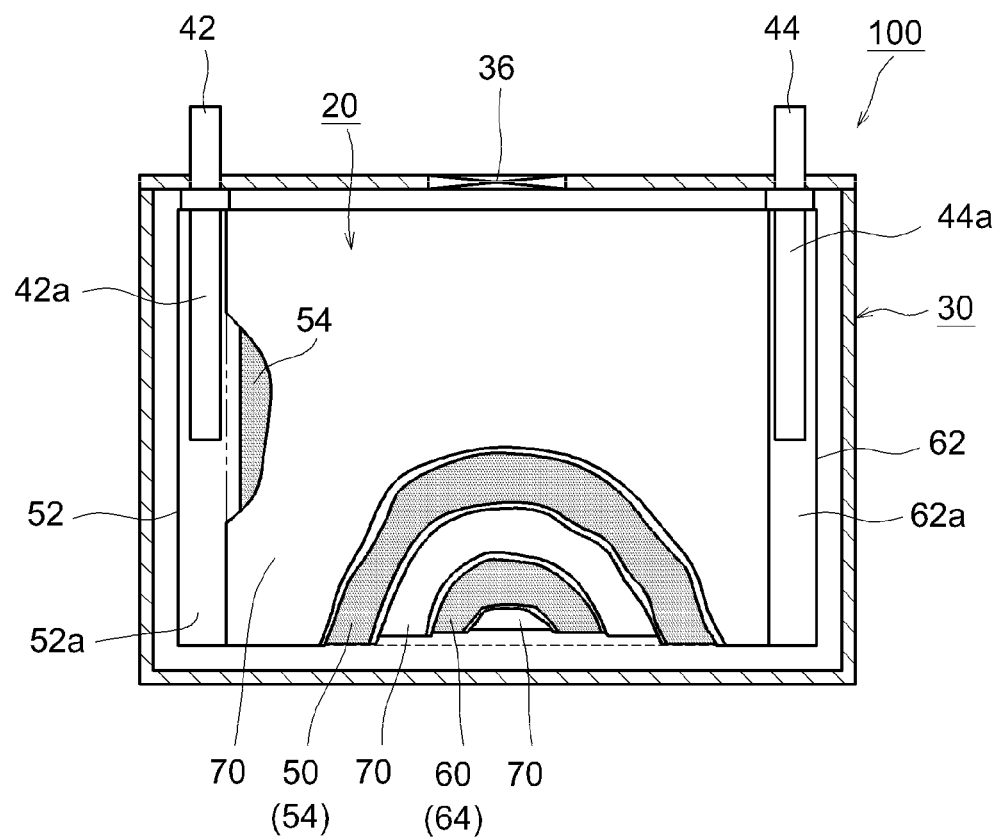
FIG. 3 is a cross-sectional view that schematically illustrates a configuration of a lithium secondary battery provided with a positive electrode according to one embodiment of the present disclosure.

A lithium secondary battery 100 shown in FIG. 3 is a sealed battery constructed by housing a flat wound electrode body 20 and a non-aqueous electrolyte solution (not shown) in a flat square battery case (that is to say, an outer container) 30. The battery case 30 is provided with a positive electrode terminal 42 and negative electrode terminal 44 for external connections, and a thin-walled safety valve 36, which is set to release the pressure inside the battery case 30 when this pressure reaches or exceeds a prescribed level. The positive and negative electrode terminals 42, 44 are electrically connected to positive and negative electrode current collector plates 42a, 44a, respectively. A metallic material which is lightweight and exhibits good thermal conductivity, such as aluminum, can be used as the constituent material of the battery case 30.

Figure 4:
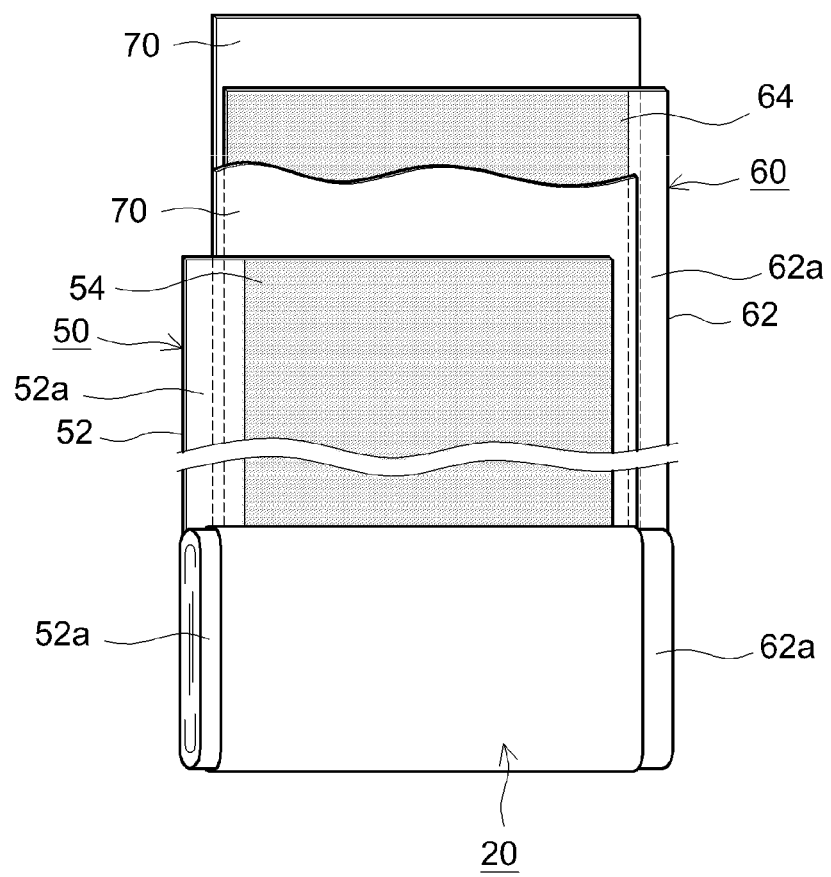
FIG. 4 is a schematic diagram that illustrates the configuration of a wound electrode body of the lithium secondary battery shown in FIG. 3.

As shown in FIG. 3 and FIG. 4, the wound electrode body 20 results from laminating a positive electrode sheet 50 in which a positive electrode active substance layer 54 is formed along the longitudinal direction, on one face or both faces (herein both faces) of an elongated positive electrode collector 52, and a negative electrode sheet 60 in which a negative electrode active substance layer 64 is formed along the longitudinal direction, on one face or both faces (herein both faces) of an elongated negative electrode collector 62, with two elongated separator sheets 70 interposed in between, and by winding then the resulting laminate in the longitudinal direction. The positive electrode collector plate 42a and the negative electrode collector plate 44a are respectively joined to a positive electrode active substance layer non-formation section 52a (i.e. exposed portion of the positive electrode collector 52 at which the positive electrode active substance layer 54 is not formed) and a negative electrode active substance layer non-formation section 62a (i.e. exposed portion of the negative electrode collector 62 at which the negative electrode active substance layer 64 is not formed) that are formed so as to protrude outward from both edges of the wound electrode body 20 in the winding axis direction thereof (sheet width direction perpendicular to the longitudinal direction).

The positive electrode 50 according to the present embodiment described above is used for the positive electrode sheet 50.

The negative electrode sheet 60 may have a similar configuration to that of negative electrodes used in publicly known lithium secondary batteries.

For example, a copper foil or the like can be used as the negative electrode current collector 62 that constitutes the negative electrode sheet 60. The negative electrode active substance layer 64 contains a negative electrode active substance. For example, a carbon material such as graphite, hard carbon or soft carbon can be used as the negative electrode active substance. The negative electrode active substance layer 64 may further contain a binder, a thickening agent, and the like. For example, a styrene-butadiene rubber (SBR) or the like can be used as the binder. For example, carboxymethyl cellulose (CMC) or the like can be used as the thickening agent.

A variety of porous sheets similar to those used in conventional lithium secondary batteries can be used as the separator 70, and examples thereof include porous resin sheets including resins such as polyethylene (PE) and polypropylene (PP). This type of porous resin sheet may have a single layer structure or a multilayer structure having two or more layers (for example, a three layer structure obtained by laminating a PP layer on both surfaces of a PE layer). A heat-resistant layer (HRL) may be provided on the separator 70.

The non-aqueous electrolyte solution can be one similar to those used in conventional lithium secondary batteries, and an electrolyte solution obtained by incorporating a supporting electrolyte in an organic solvent (a non-aqueous solvent) can typically be used. Aprotic solvents such as carbonates, esters and ethers can be used as the non-aqueous solvent. Of these, carbonates such as ethylene carbonate (EC), diethyl carbonate (DEC), dimethyl carbonate (DMC) and ethyl methyl carbonate (EMC) can be advantageously used. In addition, fluorine-based solvents, such as fluorinated carbonates such as monofluoroethylene carbonate (MFEC), difluoroethylene carbonate (DFEC), monofluoromethyldifluoromethyl carbonate (F-DMC) and trifluorodimethyl carbonate (TFDMC) can be advantageously used. It is possible to use one such non-aqueous solvent in isolation or an appropriate combination of two or more types thereof. Lithium salts such as $LiPF_6$, $LiBF_4$ and lithium bis(fluorosulfonyl)imide (LiFSI) can be advantageously used as the supporting electrolyte. The concentration of the supporting electrolyte is desirably at least 0.7 mol/L and at most 1.3 mol/L.

It should be noted that the non-aqueous electrolyte solution may contain components other than the non-aqueous solvent and supporting electrolyte mentioned above, for example, additives such as gas-generating agents, film-forming agents, dispersing agents and thickening agents, as long as the advantageous effect of the present disclosure is not significantly impaired.

The lithium secondary battery 100 can be used in a variety of applications. Examples of desired applications include motive power sources mounted to vehicles such as plug-in hybrid vehicles (PHV), hybrid vehicles (HV) and electric vehicles (EV). The lithium secondary battery 100 can be used in the form of a battery pack in which a plurality of lithium secondary batteries are electrically connected to each other.

An explanation has been given above of an angular lithium secondary battery provided with a flat wound electrode body. However, the positive electrode according to the present embodiment can be used in a variety of other types of lithium secondary battery in accordance with publicly known methods. For example, it is possible to construct a lithium secondary battery provided with a stacked-type electrode body using the positive electrode according to the present embodiment. In addition, it is possible to construct a cylindrical lithium secondary battery, a laminate-type lithium secondary battery, and the like, using the positive electrode according to the present embodiment.

In addition, it is possible to construct an all solid state lithium secondary battery using the positive electrode according to the present embodiment in accordance with a publicly known method using a solid electrolyte instead of a non-aqueous electrolyte solution.

In addition, a secondary battery other than a lithium secondary battery can be constructed according to a publicly known method using the positive electrode according to the present embodiment.

Explanations will now be given of examples relating to the present disclosure, but the present disclosure is not intended to be limited to these examples.

Example 1

Production of Coated Particle

First, $LiNi_{1/3}Co_{1/3}Mn_{1/3}O_2$ particles having a layered structure were produced as positive electrode active substances in accordance with a conventional method.

Specifically, sulfates of Ni, Co and Mn were dissolved in water at a Ni:Co:Mn molar ratio of 1:1:1. By neutralizing this solution through addition of NaOH, a composite hydroxide containing Ni, Co and Mn was precipitated as a precursor of a positive electrode active substance. The obtained composite hydroxide and lithium carbonate were mixed at a molar ratio of 1:1. $LiNi_{1/3}Co_{1/3}Mn_{1/3}O_2$ particles having a layered structure were obtained by firing this mixture for 15 hours at a temperature of 800° C. The average particle diameter ($D_{50}$) of these $LiNi_{1/3}Co_{1/3}Mn_{1/3}O_2$ particles was measured by means of a laser diffraction scattering method, and found to be 10 μm.

Next, the $LiNi_{1/3}Co_{1/3}Mn_{1/3}O_2$ particles having a layered structure were placed in a mechanochemical apparatus together with a titanium-containing compound ($TiO_2$), and subjected to a mechanochemical treatment. Mixing was carried out so that the amount of the titanium-containing compound was such that the amount of Ti in the titanium-containing compound was 0.5 mass % relative to the mass of the positive electrode active substance particles.

Positive electrode active substance particles each having a coating of a titanium-containing compound ($TiO_2$) were obtained in this way.

Production of Evaluation Lithium Secondary Batteries

The positive electrode active substance particles having the coating of a titanium-containing compound and $TiO_2$ having an average particle diameter of 5 nm as oxide particles were mixed using a planetary mixer. Mixing was carried out so that the amount of the oxide particles was such that the amount of Ti in the oxide particles was 0.5 mass % relative to the mass of the positive electrode active substance particles.

A slurry for forming a positive electrode active substance layer, having a solid content concentration of 56 mass % was prepared by mixing the obtained particle mixture, acetylene black (AB) as an electrically conductive material and poly (vinylidene fluoride) (PVDF) as a binder at the particle mixture:AB:PVDF mass ratio of 80:8:2, and mixing in N-methylpyrrolidone (NMP) using a planetary mixer. A positive electrode sheet was produced by coating this slurry on both surfaces of an aluminum foil using a die coater, drying and pressing the resultant.

In addition, a slurry for forming a negative electrode active substance layer was prepared by mixing natural graphite (C) as a negative electrode active substance, a styrene-butadiene rubber (SBR) as a binder and carboxymethyl cellulose (CMC) as a thickening agent in ion exchanged water at a C:SBR:CMC mass ratio of 98:1:1. A negative electrode sheet was produced by coating this slurry on both surfaces of a copper foil, drying and pressing the resultant.

In addition, two separator sheets (porous polyolefin sheets) were prepared.

The prepared positive electrode sheet and negative electrode sheet and the two prepared separator sheets were overlaid and wound, thereby preparing a wound electrode body. Electrode terminals were attached to the positive electrode sheet and negative electrode sheet of the produced wound electrode body by welding, and the welded body was housed in a battery case having an injection port.

Next, a non-aqueous electrolyte solution was poured into the battery case from the injection port, and the injection port was then tightly sealed. It should be noted that a non-aqueous electrolyte solution obtained by dissolving $LiPF_6$ as a supporting electrolyte at a concentration of 1.0 mol/L in a mixed solvent containing ethylene carbonate (EC), ethyl methyl carbonate (EMC) and dimethyl carbonate (DMC) at a volume ratio of 1:1:1 was used as the non-aqueous electrolyte solution.

An evaluation lithium secondary battery of Example 1 was obtained in this way.

Comparative Example 1

An evaluation lithium secondary battery was produced in the same way as in Example 1, except that $LiNi_{1/3}Co_{1/3}Mn_{1/3}O_2$ particles were used without modification (that is to say, $LiNi_{1/3}Co_{1/3}Mn_{1/3}O_2$ particles not having a coating of a titanium-containing compound were used) and oxide particles were not used.

Comparative Examples 2 to 11

Evaluation lithium secondary batteries were produced in the same way as in Example 1, except that $LiNi_{1/3}Co_{1/3}Mn_{1/3}O_2$ particles were coated with the titanium-containing compounds shown in Table 1 and oxide particles were not used.

Comparative Examples 12 to 21

Evaluation lithium secondary batteries were produced in the same way as in Example 1, except that $LiNi_{1/3}Co_{1/3}Mn_{1/3}O_2$ particles were used without modification (that is to say, $LiNi_{1/3}Co_{1/3}Mn_{1/3}O_2$ particles not having a coating of a titanium-containing compound were used) and oxide particles shown in Table 1 were used.

Examples 2 to 36

Evaluation lithium secondary batteries were produced in the same way as in Example 1, except that $LiNi_{1/3}Co_{1/3}Mn_{1/3}O_2$ particles were coated with the titanium-containing compounds shown in Table 2 and oxide particles shown in Table 2 were used.

Examples 37 to 45

Evaluation lithium secondary batteries were produced in the same way as in Example 1, except that a lithium-titanium composite oxide (Li/Ti atom number ratio=1) was used as the titanium-containing compound and $TiO_2$ having the average particle diameters shown in Table 3 were used as oxide particles.

Examples 46 to 53

Evaluation lithium secondary batteries were produced in the same way as in Example 1, except that a lithium-titanium composite oxide (Li/Ti atom number ratio=1) was used as the titanium-containing compound and when the coating was formed, the titanium-containing compound was mixed with positive electrode active substance particles so that the amount of Ti in the titanium-containing compound relative to the positive electrode active substance was the value shown in Table 3.

Examples 54 to 61

Evaluation lithium secondary batteries were produced in the same way as in Example 1, except that a lithium-titanium composite oxide (Li/Ti atom number ratio=1) was used as the titanium-containing compound and the positive electrode active substance particles and oxide particles were mixed so that the amount of Ti in the oxide particles relative to the positive electrode active substance particles was the value shown in Table 3.

Activation and Measurement of Initial Capacity

Each produced evaluation lithium secondary battery was placed in an environment at a temperature of 25° C. Activation (initial charging) was carried out using a constant current-constant voltage method, which included subjecting each evaluation lithium secondary battery to constant current charging at a current of ⅓ C to a voltage of 4.2 V, and then constant voltage charging until the current reached 1/50 C, thereby achieving a fully charged state. Next, each evaluation lithium secondary battery was subjected to constant current discharging at a current of ⅓ C to a voltage of 3.0 V. At this point, the discharge capacity was measured and thus the initial capacity was determined.

Measurement of Low Temperature Resistance

Each activated evaluation lithium secondary battery was adjusted to a voltage of 3.70 V (open circuit voltage) and then left in an environment at −28° C. Each evaluation lithium secondary battery was discharged for 8 seconds at a current of 20 C. The voltage decrease amount ΔV at this point was determined, and the battery resistance was calculated using the current and this ΔV value. With the resistance of an evaluation lithium secondary battery obtained using the positive electrode of Comparative Example 1 taken to be 1, the ratios of the resistance of evaluation lithium secondary batteries obtained using the positive electrodes of other comparative examples and examples were determined. The results are shown in Tables 1 to 3.

Evaluation of High Temperature Cycle Characteristics

Each activated evaluation lithium secondary battery was left in an environment at 60° C., and a cycle including constant current charging at a current of 10 C to a voltage of 4.2 V and then constant current discharging at a current of 10 C to a voltage of 3.3 V was repeated 500 times. The discharge capacity after the 500th cycle was determined using the same method as that used for initial capacity. As an indicator of high temperature cycle characteristics, capacity retention rate (%) was determined from (discharge capacity after 500th charging/initial capacity)×100. The results are shown in Tables 1 to 3.

Evaluation of High Voltage Operation

Each activated evaluation lithium secondary battery was left in an environment at 25° C., and a cycle including constant current charging at a current of ⅓ C to a voltage of 4.6 V and then constant current discharging at a current of ⅓ C to a voltage of 3 V was repeated 10 times. The battery resistance after the 10th cycle was measured using the same method as that described above. With the resistance of an evaluation lithium secondary battery obtained using the positive electrode of Comparative Example 1 taken to be 1, the ratios of the resistance of evaluation lithium secondary batteries obtained using the positive electrodes of other comparative examples and examples were determined. The results are shown in Tables 1 to 3.

TABLE 1

| | Positive electrode active substance particle coating | | Oxide particle in positive electrode active substance layer | | | Evaluation of characteristics | | |
|---|---|---|---|---|---|---|---|---|
| | Type of titanium-containing compound | Amount of Ti relative to active substance (mass %) | Type of oxide | Average particle diameter | Amount of Ti relative to active substance (mass %) | Low temperature resistance ratio | Capacity retention rate (%) | Resistance ratio after high voltage operation |
| Comparative Example 1 | None | 0 | None | — | 0 | 1 | 50 | 1 |
| Comparative Example 2 | TiO$_2$ | 0.5 | None | — | 0 | 0.98 | 55 | 1.1 |
| Comparative Example 3 | Ti$_3$O$_5$ | 0.5 | None | — | 0 | 0.97 | 54 | 1.1 |
| Comparative Example 4 | Ti$_4$O$_7$ | 0.5 | None | — | 0 | 0.96 | 56 | 1.13 |
| Comparative Example 5 | Ti$_5$O$_9$ | 0.5 | None | — | 0 | 0.95 | 53 | 1.25 |
| Comparative Example 6 | LTO (Li/Ti = 0.1) | 0.5 | None | — | 0 | 0.96 | 55 | 1.1 |
| Comparative Example 7 | LTO (Li/Ti = 0.5) | 0.5 | None | — | 0 | 0.95 | 55 | 1.12 |
| Comparative Example 8 | LTO (Li/Ti = 1) | 0.5 | None | — | 0 | 0.97 | 57 | 1.15 |
| Comparative Example 9 | LTO (Li/Ti = 2) | 0.5 | None | — | 0 | 0.95 | 56 | 1.16 |
| Comparative Example 10 | LTO (Li/Ti = 2.5) | 0.5 | None | — | 0 | 0.94 | 52 | 1.16 |
| Comparative Example 11 | LTO (Li/Ti = 3) | 0.5 | None | — | 0 | 0.96 | 52 | 1.17 |
| Comparative Example 12 | None | 0 | TiO$_2$ | 5 nm | 0.5 | 0.96 | 56 | 1.18 |
| Comparative Example 13 | None | 0 | Ti$_3$O$_5$ | 5 nm | 0.5 | 0.97 | 57 | 1.12 |
| Comparative Example 14 | None | 0 | Ti$_4$O$_7$ | 5 nm | 0.5 | 0.93 | 58 | 1.17 |
| Comparative Example 15 | None | 0 | Ti$_5$O$_9$ | 5 nm | 0.5 | 0.95 | 56 | 1.17 |
| Comparative Example 16 | None | 0 | LTO (Li/Ti = 0.1) | 5 nm | 0.5 | 0.96 | 54 | 1.12 |
| Comparative Example 17 | None | 0 | LTO (Li/Ti = 0.5) | 5 nm | 0.5 | 0.94 | 57 | 1.13 |
| Comparative Example 18 | None | 0 | LTO (Li/Ti = 1) | 5 nm | 0.5 | 0.97 | 58 | 1.16 |
| Comparative Example 19 | None | 0 | LTO (Li/Ti = 2) | 5 nm | 0.5 | 0.98 | 54 | 1.12 |
| Comparative Example 20 | None | 0 | LTO (Li/Ti = 2.5) | 5 nm | 0.5 | 0.95 | 56 | 1.18 |
| Comparative Example 21 | None | 0 | LTO (Li/Ti = 3) | 5 nm | 0.5 | 0.95 | 53 | 1.12 |

* "LTO" denotes a lithium-titanium composite oxide, and the Li/Ti ratio is the atom number ratio.

TABLE 2

| | Positive electrode active substance particle coating | | Oxide particle in positive electrode active substance layer | | | Evaluation of characteristics | | |
|---|---|---|---|---|---|---|---|---|
| | Type of titanium-containing compound | Amount of Ti relative to active substance (mass %) | Type of oxide | Average particle diameter | Amount of Ti relative to active substance (mass %) | Low temperature resistance ratio | Capacity retention rate (%) | Resistance ratio after high voltage operation |
| Example 1 | TiO$_2$ | 0.5 | TiO$_2$ | 5 nm | 0.5 | 0.64 | 85 | 0.73 |
| Example 2 | Ti$_3$O$_5$ | 0.5 | TiO$_2$ | 5 nm | 0.5 | 0.64 | 84 | 0.74 |
| Example 3 | Ti$_4$O$_7$ | 0.5 | TiO$_2$ | 5 nm | 0.5 | 0.66 | 83 | 0.73 |
| Example 4 | Ti$_5$O$_9$ | 0.5 | TiO$_2$ | 5 nm | 0.5 | 0.633 | 85 | 0.74 |
| Example 5 | TiO$_2$ | 0.5 | LTO (Li/Ti = 1) | 5 nm | 0.5 | 0.64 | 81 | 0.75 |
| Example 6 | Ti$_3$O$_5$ | 0.5 | LTO (Li/Ti = 1) | 5 nm | 0.5 | 0.68 | 82 | 0.76 |
| Example 7 | Ti$_4$O$_7$ | 0.5 | LTO (Li/Ti = 1) | 5 nm | 0.5 | 0.64 | 84 | 0.73 |

TABLE 2-continued

| | Positive electrode active substance particle coating | | Oxide particle in positive electrode active substance layer | | | Evaluation of characteristics | | |
|---|---|---|---|---|---|---|---|---|
| | Type of titanium-containing compound | Amount of Ti relative to active substance (mass %) | Type of oxide | Average particle diameter | Amount of Ti relative to active substance (mass %) | Low temperature resistance ratio | Capacity retention rate (%) | Resistance ratio after high voltage operation |
| Example 8 | $Ti_5O_9$ | 0.5 | LTO (Li/Ti = 1) | 5 nm | 0.5 | 0.63 | 85 | 0.72 |
| Example 9 | LTO (Li/Ti = 0.1) | 0.5 | $TiO_2$ | 5 nm | 0.5 | 0.62 | 83 | 0.71 |
| Example 10 | LTO (Li/Ti = 0.5) | 0.5 | $TiO_2$ | 5 nm | 0.5 | 0.61 | 82 | 0.76 |
| Example 11 | LTO (Li/Ti = 1) | 0.5 | $TiO_2$ | 5 nm | 0.5 | 0.63 | 83 | 0.74 |
| Example 12 | LTO (Li/Ti = 2) | 0.5 | $TiO_2$ | 5 nm | 0.5 | 0.64 | 85 | 0.73 |
| Example 13 | LTO (Li/Ti = 2.5) | 0.5 | $TiO_2$ | 5 nm | 0.5 | 0.67 | 81 | 0.74 |
| Example 14 | LTO (Li/Ti = 3) | 0.5 | $TiO_2$ | 5 nm | 0.5 | 0.64 | 83 | 0.76 |
| Example 15 | LTO (Li/Ti = 0.1) | 0.5 | LTO (Li/Ti = 1) | 5 nm | 0.5 | 0.63 | 82 | 0.74 |
| Example 16 | LTO (Li/Ti = 0.5) | 0.5 | LTO (Li/Ti = 1) | 5 nm | 0.5 | 0.64 | 85 | 0.73 |
| Example 17 | LTO (Li/Ti = 1) | 0.5 | LTO (Li/Ti = 1) | 5 nm | 0.5 | 0.67 | 83 | 0.71 |
| Example 18 | LTO (Li/Ti = 2) | 0.5 | LTO (Li/Ti = 1) | 5 nm | 0.5 | 0.623 | 82 | 0.76 |
| Example 19 | LTO (Li/Ti = 2.5) | 0.5 | LTO (Li/Ti = 1) | 5 nm | 0.5 | 0.64 | 81 | 0.74 |
| Example 20 | LTO (Li/Ti = 3) | 0.5 | LTO (Li/Ti = 1) | 5 nm | 0.5 | 0.64 | 83 | 0.73 |
| Example 21 | $TiO_2$ | 0.5 | $Ti_3O_5$ | 5 nm | 0.5 | 0.67 | 84 | 0.72 |
| Example 22 | $TiO_2$ | 0.5 | $Ti_4O_7$ | 5 nm | 0.5 | 0.67 | 85 | 0.76 |
| Example 23 | $TiO_2$ | 0.5 | $Ti_5O_9$ | 5 nm | 0.5 | 0.66 | 82 | 0.71 |
| Example 24 | LTO (Li/Ti = 1) | 0.5 | $Ti_3O_5$ | 5 nm | 0.5 | 0.65 | 83 | 0.74 |
| Example 25 | LTO (Li/Ti = 1) | 0.5 | $Ti_4O_7$ | 5 nm | 0.5 | 0.63 | 85 | 0.73 |
| Example 26 | LTO (Li/Ti =1) | 0.5 | $Ti_5O_9$ | 5 nm | 0.5 | 0.65 | 81 | 0.72 |
| Example 27 | $TiO_2$ | 0.5 | LTO (Li/Ti = 0.1) | 5 nm | 0.5 | 0.62 | 83 | 0.76 |
| Example 28 | $TiO_2$ | 0.5 | LTO (Li/Ti = 0.5) | 5 nm | 0.5 | 0.64 | 84 | 0.73 |
| Example 29 | $TiO_2$ | 0.5 | LTO (Li/Ti = 2) | 5 nm | 0.5 | 0.63 | 85 | 0.76 |
| Example 30 | $TiO_2$ | 0.5 | LTO (Li/Ti = 2.5) | 5 nm | 0.5 | 0.64 | 83 | 0.74 |
| Example 31 | $TiO_2$ | 0.5 | LTO (Li/Ti = 3) | 5 nm | 0.5 | 0.67 | 82 | 0.74 |
| Example 32 | LTO (Li/Ti = 1) | 0.5 | LTO (Li/Ti = 0.1) | 5 nm | 0.5 | 0.623 | 83 | 0.72 |
| Example 33 | LTO (Li/Ti = 1) | 0.5 | LTO (Li/Ti = 0.5) | 5 nm | 0.5 | 0.64 | 83 | 0.73 |
| Example 34 | LTO (Li/Ti = 1) | 0.5 | LTO (Li/Ti = 2) | 5 nm | 0.5 | 0.64 | 83 | 0.74 |
| Example 35 | LTO (Li/Ti = 1) | 0.5 | LTO (Li/Ti = 2.5) | 5 nm | 0.5 | 0.67 | 85 | 0.73 |
| Example 36 | LTO (Li/Ti = 1) | 0.5 | LTO (Li/Ti = 3) | 5 nm | 0.5 | 0.67 | 81 | 0.72 |

* "LTO" denotes a lithium-titanium composite oxide, and the Li/Ti ratio is the atom number ratio.

TABLE 3

| | Positive electrode active substance particle coating | | Oxide particle in positive electrode active substance layer | | | Evaluation of characteristics | | |
|---|---|---|---|---|---|---|---|---|
| | Type of titanium-containing compound | Amount of Ti relative to active substance (mass %) | Type of oxide | Average particle diameter | Amount of Ti relative to active substance (mass %) | Low temperature resistance ratio | Capacity retention rate (%) | Resistance ratio after high voltage operation |
| Example 37 | LTO (Li/Ti = 1) | 0.5 | $TiO_2$ | 0.4 nm | 0.5 | 0.81 | 71 | 0.84 |
| Example 38 | LTO (Li/Ti = 1) | 0.5 | $TiO_2$ | 0.5 nm | 0.5 | 0.63 | 83 | 0.76 |
| Example 39 | LTO (Li/Ti = 1) | 0.5 | $TiO_2$ | 1 nm | 0.5 | 0.623 | 85 | 0.74 |
| Example 40 | LTO (Li/Ti = 1) | 0.5 | $TiO_2$ | 10 nm | 0.5 | 0.64 | 81 | 0.73 |
| Example 41 | LTO (Li/Ti = 1) | 0.5 | $TiO_2$ | 50 nm | 0.5 | 0.64 | 83 | 0.74 |
| Example 42 | LTO (Li/Ti = 1) | 0.5 | $TiO_2$ | 100 nm | 0.5 | 0.67 | 85 | 0.71 |
| Example 43 | LTO (Li/Ti = 1) | 0.5 | $TiO_2$ | 500 nm | 0.5 | 0.623 | 83 | 0.73 |
| Example 44 | LTO (Li/Ti = 1) | 0.5 | $TiO_2$ | 1 μm | 0.5 | 0.65 | 82 | 0.76 |
| Example 45 | LTO (Li/Ti = 1) | 0.5 | $TiO_2$ | 1.5 μm | 0.5 | 0.82 | 72 | 0.85 |
| Example 46 | LTO (Li/Ti = 1) | 0.005 | $TiO_2$ | 5 nm | 0.5 | 0.83 | 70 | 0.85 |
| Example 47 | LTO (Li/Ti = 1) | 0.01 | $TiO_2$ | 5 nm | 0.5 | 0.67 | 83 | 0.76 |
| Example 48 | LTO (Li/Ti = 1) | 0.1 | $TiO_2$ | 5 nm | 0.5 | 0.66 | 82 | 0.76 |
| Example 49 | LTO (Li/Ti = 1) | 1 | $TiO_2$ | 5 nm | 0.5 | 0.67 | 81 | 0.72 |
| Example 50 | LTO (Li/Ti = 1) | 2 | $TiO_2$ | 5 nm | 0.5 | 0.67 | 83 | 0.71 |
| Example 51 | LTO (Li/Ti = 1) | 4 | $TiO_2$ | 5 nm | 0.5 | 0.66 | 84 | 0.73 |
| Example 52 | LTO (Li/Ti = 1) | 5 | $TiO_2$ | 5 nm | 0.5 | 0.65 | 85 | 0.74 |
| Example 53 | LTO (Li/Ti = 1) | 6 | $TiO_2$ | 5 nm | 0.5 | 0.80 | 72 | 0.83 |
| Example 54 | LTO (Li/Ti = 1) | 0.5 | $TiO_2$ | 5 nm | 0.0005 | 0.79 | 73 | 0.85 |
| Example 55 | LTO (Li/Ti = 1) | 0.5 | $TiO_2$ | 5 nm | 0.001 | 0.67 | 81 | 0.75 |
| Example 56 | LTO (Li/Ti = 1) | 0.5 | $TiO_2$ | 5 nm | 0.01 | 0.66 | 83 | 0.74 |
| Example 57 | LTO (Li/Ti = 1) | 0.5 | $TiO_2$ | 5 nm | 0.1 | 0.64 | 82 | 0.73 |
| Example 58 | LTO (Li/Ti = 1) | 0.5 | $TiO_2$ | 5 nm | 1 | 0.67 | 85 | 0.72 |
| Example 59 | LTO (Li/Ti = 1) | 0.5 | $TiO_2$ | 5 nm | 1.5 | 0.64 | 83 | 0.74 |
| Example 60 | LTO (Li/Ti = 1) | 0.5 | $TiO_2$ | 5 nm | 2 | 0.67 | 82 | 0.76 |
| Example 61 | LTO (Li/Ti = 1) | 0.5 | $TiO_2$ | 5 nm | 3 | 0.78 | 71 | 0.86 |

* "LTO" denotes a lithium-titanium composite oxide, and the Li/Ti ratio is the atom number ratio.

From the results in Table 1 and Table 2, it is understood that in the case of a positive electrode in which positive electrode active substance particles each having the coating of the specific titanium-containing compound mentioned above and the specific oxide particles mentioned above coexist in the positive electrode active substance layer, it is possible to obtain a lithium secondary battery that exhibits excellent low temperature output characteristics, excellent high temperature cycle characteristics and excellent durability against high voltage.

In addition, from the results of Examples 37 to 45 in Table 3, it is understood that in cases where the average particle diameter of the oxide particles is at least 0.5 nm and at most 1 μm, the effects of improving low temperature output characteristics, improving high temperature cycle characteristics and improving durability against high voltage are particularly enhanced.

In addition, from the results of Examples 46 to 53 in Table 3, it is understood that in cases where the amount of Ti contained in the titanium-containing compound of the coating is at least 0.01 mass % and at most 5 mass % relative to the mass of the positive electrode active substance particle, the effects of improving low temperature output characteristics, improving high temperature cycle characteristics and improving durability against high voltage are particularly enhanced.

In addition, from the results of Examples 54 to 61 in Table 3, it is understood that in cases where the content of Ti contained in the oxide particles is at least 0.001 mass % and at most 2 mass % relative to the mass of the positive electrode active substance particles, the effects of improving low temperature output characteristics, improving high temperature cycle characteristics and improving durability against high voltage are particularly enhanced.

Comparative Examples 22 to 27

Evaluation lithium secondary batteries were produced in the same way as in Comparative Example 1, except that the positive electrode active substances shown in Table 4 were used.

Examples 62 to 67

Evaluation lithium secondary batteries were produced in the same way as in Example 17, except that the positive electrode active substances shown in Table 4 were used.
Evaluation of Characteristics The evaluation lithium secondary batteries of Comparative Examples 22 to 27 and Examples 62 to 67 were subjected to activation, initial capacity measurements, low temperature resistance measurements, high temperature cycle characteristics evaluation, and high voltage operation evaluations in the same way as described above.

For the low temperature resistance measurements and high voltage operation evaluations in experimental examples carried out using active substances having the same composition, the resistance of an example was determined as a ratio relative to a value of 1 for the resistance value of a comparative example. The evaluation results are shown in Table 4.

62 to 67, the effects of improving low temperature output characteristics, improving high temperature cycle characteristics and improving durability against high voltage can be achieved regardless of the composition and crystal structure of the positive electrode active substance.

From the results above, it is understood that by using the positive electrode of a secondary battery according to the present embodiment, it is possible to impart a secondary battery with excellent low temperature output characteristics, excellent high temperature cycle characteristics and excellent durability against high voltage.

Specific examples of the present disclosure have been explained in detail above, but these are merely examples, and do not limit the scope of the claims. The features disclosed in the claims also encompass modes obtained by variously modifying or altering the specific examples shown above.

What is claimed is:
1. A positive electrode of a secondary battery, the positive electrode comprising:
a positive electrode current collector; and
a positive electrode active substance layer provided on the positive electrode current collector, wherein
the positive electrode active substance layer contains positive electrode active substance particles and oxide particles which are dispersed in the positive electrode active substance layer as separate particles from the positive electrode active substance particles,
the positive electrode active substance particles each include a coating containing a titanium-containing compound at a surface thereof,

TABLE 4

| | | Positive electrode active substance particle coating | | Oxide particle in positive electrode active substance layer | | | Evaluation of characteristics | | |
|---|---|---|---|---|---|---|---|---|---|
| | Positive electrode active substance particle Composition | Type of titanium-containing compound | Amount of Ti relative to active substance (mass %) | Type of oxide | Average particle diameter | Amount of Ti relative to active substance (mass %) | Low temperature resistance ratio | Capacity retention rate (%) | Resistance ratio after high voltage operation |
| Comparative Example 22 | $LiCoO_2$ | None | 0 | None | — | 0 | 1 | 41 | 1 |
| Example 62 | $LiCoO_2$ | LTO (Li/Ti = 1) | 0.5 | LTO (Li/Ti = 1) | 5 nm | 0.5 | 0.54 | 83 | 0.72 |
| Comparative Example 23 | $LiMn_2O_4$ | None | 0 | None | — | 0 | 1 | 42 | 1 |
| Example 63 | $LiMn_2O_4$ | LTO (Li/Ti = 1) | 0.5 | LTO (Li/Ti = 1) | 5 nm | 0.5 | 0.65 | 85 | 0.75 |
| Comparative Example 24 | $LiNiO_2$ | None | 0 | None | — | 0 | 1 | 45 | 1 |
| Example 64 | $LiNiO_2$ | LTO (Li/Ti = 1) | 0.5 | LTO (Li/Ti = 1) | 5 nm | 0.5 | 0.65 | 82 | 0.73 |
| Comparative Example 25 | $LiNi_{0.5}Mn_{1.5}O_4$ | None | 0 | None | — | 0 | 1 | 43 | 1 |
| Example 65 | $LiNi_{0.5}Mn_{1.5}O_4$ | LTO (Li/Ti = 1) | 0.5 | LTO (Li/Ti = 1) | 5 nm | 0.5 | 0.67 | 82 | 0.71 |
| Comparative Example 26 | $LiNi_{0.8}Co_{0.15}Al_{0.05}O_2$ | None | 0 | None | — | 0 | 1 | 45 | 1 |
| Example 66 | $LiNi_{0.8}Co_{0.15}Al_{0.05}O_2$ | LTO (Li/Ti = 1) | 0.5 | LTO (Li/Ti = 1) | 5 nm | 0.5 | 0.63 | 85 | 0.72 |
| Comparative Example 27 | $LiFePO_4$ | None | 0 | None | — | 0 | 1 | 42 | 1 |
| Example 67 | $LiFePO_4$ | LTO (Li/Ti = 1) | 0.5 | LTO (Li/Ti = 1) | 5 nm | 0.5 | 0.64 | 84 | 0.73 |

From the results in Table 4, it is understood that by comparing Comparative Examples 22 to 27 and Examples the titanium-containing compound in the coating is at least one compound selected from the group consisting of $TiO_2$, $Ti_nO_{2n-1}$, wherein n is an integer of 3 or more, and oxides containing Li and Ti, and the oxide particles include at least one oxide selected from the group consisting of $TiO_2$, $Ti_mO_{2m-1}$, wherein m is an integer of 3 or more, and oxides containing Li and Ti.

2. The positive electrode of a secondary battery according to claim 1, wherein an average particle diameter of the oxide particles is at least 0.5 nm and at most 1 μm.

3. The positive electrode of a secondary battery according to claim 1, wherein an amount of Ti contained in the titanium-containing compound of the coating is at least 0.01 mass % and at most 5 mass % relative to a mass of a single particle of the positive electrode active substance particles.

4. The positive electrode of a secondary battery according to claim 1, wherein an amount of Ti contained in the oxide particles is at least 0.001 mass % and at most 2 mass % relative to a mass of the positive electrode active substance particles.

5. A secondary battery comprising the positive electrode of a secondary battery according to claim 1.

* * * * *